(12) United States Patent
Achenbach

(10) Patent No.: US 8,960,385 B2
(45) Date of Patent: Feb. 24, 2015

(54) DAMPER FOR A BICYCLE

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 573 days.

(21) Appl. No.: 13/105,233

(22) Filed: May 11, 2011

(65) Prior Publication Data

US 2011/0278776 A1 Nov. 17, 2011

(30) Foreign Application Priority Data

May 14, 2010 (DE) .......................... 10 2010 020 478

(51) Int. Cl.
*F16D 57/00* (2006.01)
*F16F 9/06* (2006.01)
*F16F 9/32* (2006.01)

(52) U.S. Cl.
CPC ............... *F16F 9/064* (2013.01); *F16F 9/3214* (2013.01)
USPC ........... 188/266; 188/287; 188/312; 188/318; 188/319; 188/322.13; 267/54.8; 267/64.15; 267/64.26

(58) Field of Classification Search
USPC ............ 188/312–314, 318, 319, 322.13, 266, 188/287; 267/54.8, 64.15, 64.26
See application file for complete search history.

(56) References Cited

U.S. PATENT DOCUMENTS

| | | | | |
|---|---|---|---|---|
| 4,153,237 A | * | 5/1979 | Supalla | 267/64.15 |
| 4,524,844 A | * | 6/1985 | Williams, Jr. | 180/219 |
| 5,158,267 A | * | 10/1992 | Pascal | 267/64.12 |
| 5,295,563 A | * | 3/1994 | Bennett | 188/266.2 |
| 5,476,161 A | * | 12/1995 | Tang et al. | 188/266.5 |
| 5,996,978 A | * | 12/1999 | Asanuma et al. | 267/34 |
| 6,032,933 A | * | 3/2000 | Beck | 267/64.17 |
| 6,340,153 B1 | * | 1/2002 | Miesner | 267/140.11 |
| 6,494,441 B2 | * | 12/2002 | Beck et al. | 267/64.16 |
| 7,219,881 B2 | | 5/2007 | Denk | |
| 2001/0007297 A1 | * | 7/2001 | Gramb | 188/298 |
| 2006/0231360 A1 | * | 10/2006 | Chen | 188/314 |
| 2009/0072512 A1 | | 3/2009 | Earle | |

FOREIGN PATENT DOCUMENTS

| | | |
|---|---|---|
| DE | 2 365 038 | 7/1974 |
| DE | 24 53 986 | 5/1976 |
| DE | 301 409 | 12/1992 |
| DE | 197 10 697 | 10/1997 |
| DE | 100 25 901 | 10/2001 |
| DE | 102 51 213 | 3/2004 |
| DE | 10 2005 062 433 | 6/2007 |
| GB | 2346665 A * | 8/2000 |
| JP | 03281418 A * | 12/1991 |

OTHER PUBLICATIONS

Search Report of the German Patent and Trademark Office of priority application 10 2010 020 478.1.

* cited by examiner

*Primary Examiner* — Thomas Irvin
*Assistant Examiner* — Mahbubur Rashid
(74) *Attorney, Agent, or Firm* — Greer, Burns & Crain, Ltd.

(57) ABSTRACT

A pull shock damper for a bicycle comprising a spring device and a damper device, the spring device comprising a positive spring and a gas-operated negative chamber. The damper device comprises a first oil chamber and a second oil chamber connected therewith. The negative chamber abuts the first oil chamber via a piston. A tubular structure extends from the piston through the negative chamber interior up to the end of the negative chamber. The piston rod of the piston extends through the first oil chamber to the exterior.

11 Claims, 7 Drawing Sheets

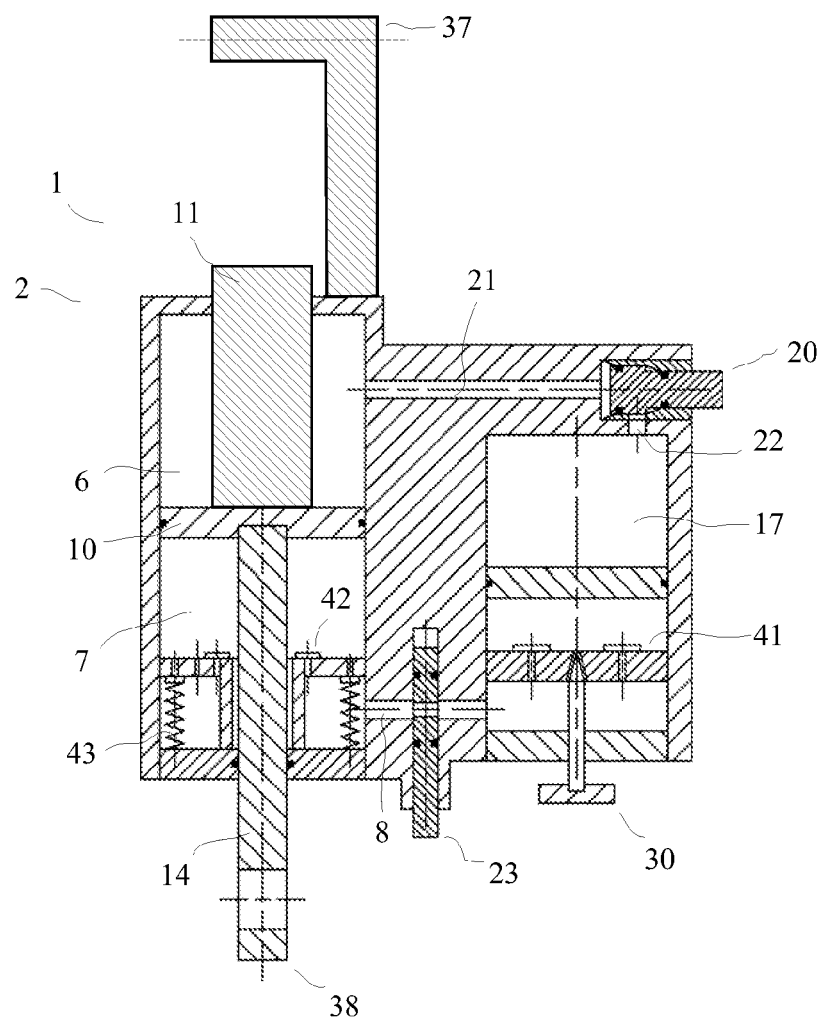
Fig. 4
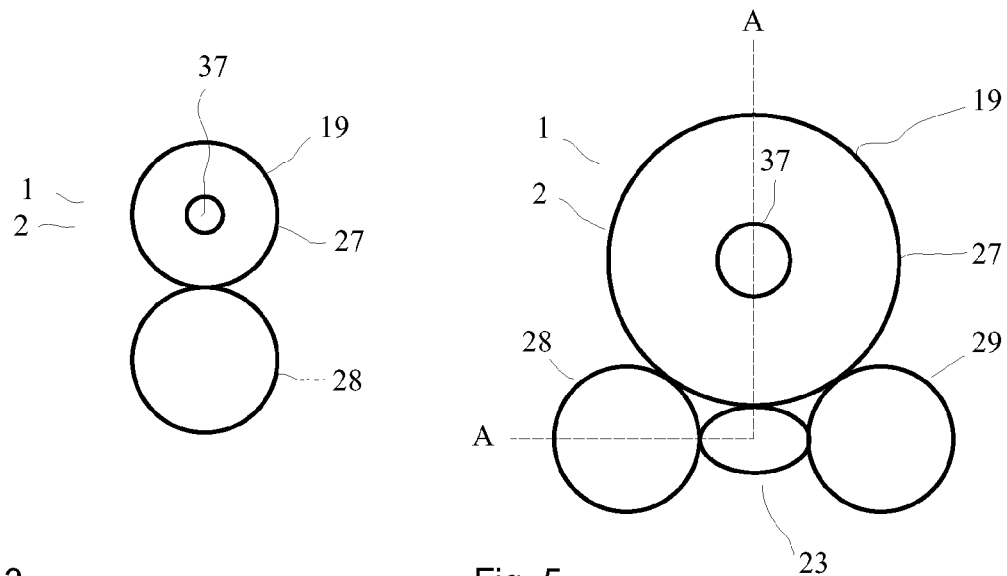
Fig. 3
Fig. 5

DAMPER FOR A BICYCLE

BACKGROUND

The present invention relates to a damper for a bicycle and in particular to a pull shock damper for a bicycle which is employed in particular for damping shocks at the rear wheel of a bicycle. A pull shock damper is a damper where the piston rod is pulled out of the damper housing as the wheel deflects. In conventional dampers, however, the piston rod enters the damper housing as the wheel deflects. Although the invention will be described below substantially with reference to pull shock dampers, the invention may, however, likewise be employed for conventional dampers.

In the prior art for example U.S. Pat. No. 7,219,881 B2 disclosed a pull shock damper described therein with reference to FIG. 31. The known damper comprises one gas-filled negative spring and two oil- and gas-filled positive springs. The negative spring serves to linearize the load-deflection curves of the damper. On the whole the known damper is provided with three air chambers the filling pressures of which can be separately adjusted via separate valves. Due to the required damping characteristics a suitable filling pressure for operation is approximately 30% lower in the negative chamber than in the positive chamber.

It has been found that due to the manifold setting options even some experienced users may set inappropriate pressure relations in these dampers which will impair the riding properties and lead to undesirable spring and damping results since the force of the negative spring tends to be too high or too low.

SUMMARY

It is therefore the object of the present invention to provide a damper for a bicycle and in particular a pull shock damper for a bicycle which allows simpler setting options.

A damper according to the invention is provided to be employed in a bicycle and is in particular configured as a pull shock damper. The inventive damper comprises at least one spring device and at least one damper device. The spring device comprises at least one positive spring and at least one negative spring with at least one gas-operated negative chamber. The damper device comprises at least one first oil chamber and at least one second oil chamber connected therewith via in particular at least one flow duct. Said negative chamber abuts the first oil chamber via a floating piston. The floating piston is firmly connected with the piston rod. At least one tubular structure extends from the floating piston through the negative chamber interior at least up to the end of the negative chamber. The piston rod of the floating piston extends through the first oil chamber to the exterior.

The damper according to the invention has many advantages. One considerable advantage of the inventive damper consists in that the force acting on the floating piston from the negative chamber is lower than without the tubular structure. The negative chamber is sealed gas-tight relative to the tubular structure. The internal pressure inside the tubular structure is markedly lower than in the negative chamber. In this way the force acting on the floating piston is considerably reduced. This configuration allows, with the same exterior dimensions and the same forces acting on the floating piston, to increase the internal pressure in the negative chamber. In particular does this configuration also allow to equal the internal pressure in the negative chamber in the filled state to the internal pressure in a gas-operated positive chamber. This allows particularly simple adjustment of the damper since the user can set the pressure in the negative chamber and in a positive chamber if any, at the same height, thus achieving optimal results.

In the inventive damper the tubular structure extends from the piston or floating piston through the interior of the negative chamber up to the end of the negative chamber opposite the floating piston. This end may for example be designated the first end. The piston rod of the floating piston then extends through the second end opposite the first end to the exterior. The tubular structure is firmly connected with the floating piston. The floating piston acts as a pump plunger and is preferably configured tight such that no fluid flows through the floating piston.

The first negative chamber and the first oil chamber are in particular arranged jointly in a housing or housing part.

The negative chamber is located on the one side of the floating piston. The oil chamber and in particular the first oil chamber is arranged on the other side of the floating piston.

In particularly preferred more specific embodiments the tubular structure comprises at least two telescopic tubes interconnected to be gas-tight, extending at least from the floating piston up to the opposite end of the negative chamber. The tubular structure interior is sealed gas-tight relative to the negative chamber. This is to ensure that the effective area applying the pressure prevailing in the negative chamber on the floating piston, is smaller by the cross-sectional area of the tubular structure. In the tubular structure interior in particular ambient pressure or just slight excess pressure prevails. By way of compressing the negative chamber the pressure prevailing within the tubular structure may likewise change and in particular increase. However, since the pressure prevailing in the negative chamber is typically 10 or 20 bar or more while the pressure prevailing in the tubular structure interior is approximately 1 or 2 bar in the normal state, the contribution of the tubular structure interior to the force acting on the floating piston is very small.

Employing the tubular structure allows in a simple way to maintain the force effective on the floating piston at the same level while the internal pressure in the negative chamber in the normal state increases considerably.

In the case of conventional dampers the pressure set in the negative chamber in the normal state is typically approximately 30% lower than the pressure in the positive chamber. The invention allows to select the pressure in the negative chamber at the same level as in the positive chamber wherein due to the reduced effective area the effective force is the same as in the prior art where the effective area has been larger and the prevailing pressure, lower.

Preferably an external diameter and in particular an effective external diameter of the tubular structure is larger than an external diameter of the piston rod. In this way it is ensured that the effective force acting from the negative chamber on the floating piston is reduced. Particularly preferably a diameter ratio between effective tubular structure diameter and external piston rod diameter is larger than 12:10, in particular larger than 15:10. Given a round cross-section and a diameter ratio of 15:10 an area ratio of 2.25 is obtained. Thus the effectively acting force is quite considerably reduced.

In one configuration the diameter ratio between 18:10 and 22:10 is e.g. 20:10, resulting in an area ratio of 4:1.

Independently of the shape of the piston rod and the shape of the tubular structure it is also particularly preferred for the effective area of the tubular structure to be larger than the effective cross-sectional area of the piston rod. In particular is the area ratio of the cross-section of the effective tubular structure to the cross-sectional area of the piston rod larger than 15:10 and in particular larger than 20:10 and particularly preferably larger than 30:10. The effective area of the tubular structure corresponds to the portion of the area not applying any significant pressure on the floating piston in the direction of the first oil chamber.

In a preferred embodiment the tubular structure extends through the end of the negative chamber to the exterior. In such a configuration the tubular structure does not need to be configured telescopic. In this configuration the tubular structure is sealed off from the negative chamber to allow a long-term and effective sealing of the negative chamber. In particular in these embodiments an effective tubular structure diameter is larger than an effective piston rod diameter and/or an effective tubular structure area is larger than an effective piston rod area. In this way a reduction of the effective force of the negative spring is ensured while the internal pressure is maintained.

All of the embodiments preferably provide for the positive spring to comprise at least one gas-operated positive chamber.

It is conceivable for the negative chamber of the negative spring to be filled with gas only. Or else it is conceivable for part of the negative chamber to be filled with a resilient spring or for the negative chamber to contain a fluid portion.

In the positive chamber the resilient action is in particular generated by a gas at least in part. Or else it is conceivable for the positive chamber to also contain at least one resilient spring or the like.

In particularly preferred configurations the damper is provided with an in particular shared air valve which serves to fill the negative chamber and at least one positive chamber. The negative chamber and the positive chamber can be simultaneously filled via the shared air valve. This allows for the negative chamber and the positive chamber to always be filled to the same pressure level in filling. This considerably facilitates the settings and configuration of the damper since maladjustments due to inappropriate pressure ratios in the negative chamber and the positive chamber are reliably avoided.

The air valve is connected with the negative chamber and the positive chamber via at least one duct. In particular is the air valve connected with the negative chamber via a first duct and with the positive chamber via a second duct to set substantially the same pressure in the negative chamber and in the positive chamber in filling with air. With the air valve closed, however, there is no and in particular no constantly open flowd connection between the positive chamber and the negative chamber via the ducts.

In all of the configurations it is preferred for an adjustable throttle device with at least one throttle valve to be provided between the first oil chamber and the second oil chamber. In particular is it possible to provide at least one throttle valve for high-speed damping and at least one throttle valve for low-speed damping for the compression stage and/or the rebound stage. Preferably a lock-out valve is provided for blocking the connection.

In all the configurations a positive chamber may be separated from the second oil chamber by means of a separating device. Or else it is possible for the second oil chamber and the positive chamber to be configured as one common chamber. The separating device is configured as, or may comprise, a floating piston.

It is also possible and preferred for the second oil chamber to be separated from the positive chamber by a flexible separating device. The second oil chamber may for example be separated from the positive chamber by a rubber bulb or a membrane.

Preferably the second oil chamber and the positive chamber are positioned in one housing part with the second oil chamber being separated from the positive chamber by a separating device in the shape of e.g. a floating piston. It is also possible and preferred for a third oil chamber and a second positive chamber to be provided which interact with one another and are optionally separated from one another by a second separating device or by a second floating piston. When a first and at least one second positive chamber are provided, then it is preferred for the first positive chamber to interact with the second oil chamber and the second positive chamber, with the third oil chamber.

Or else it is possible to employ at least one other oil chamber and a second negative chamber separated from one another by another separating device. In these configurations it is possible to largely influence the characteristics of both the negative spring and the positive spring by adjusting, or engaging or disengaging single negative or positive chambers.

It is in particular preferred for the positive spring progression to be variable. To this end at least one positive chamber may be configured to be engaged additionally.

It is also possible and preferred for at least two positive chambers to be provided at different effective diameters or different and/or adjustable lengths to largely adjust the progression of the positive chamber or the damper calculatedly.

In all of the configurations the damper preferably comprises at least one valve for deaerating the interior of the tubular structure. In case that gas should get e.g. from the negative chamber into the tubular structure interior, the pressure therein increasing, the interior may be deaerated. The valve may be configured as a manual or else an automatic de-aeration valve and comprise a valve channel leading immediately into the exterior ambience.

BRIEF DESCRIPTION OF THE DRAWINGS

Further advantages and features of the invention follow from the embodiments which will be discussed below with reference to the enclosed figures.

The figures show in:

FIG. 3 a simplistic top view of the damper according to FIG. 1;

FIG. 4 a cross-section of another embodiment of an inventive damper;

FIG. 5 a simplistic, schematic top view of yet another embodiment of an inventive damper;

DETAILED DESCRIPTION

Figure 1:
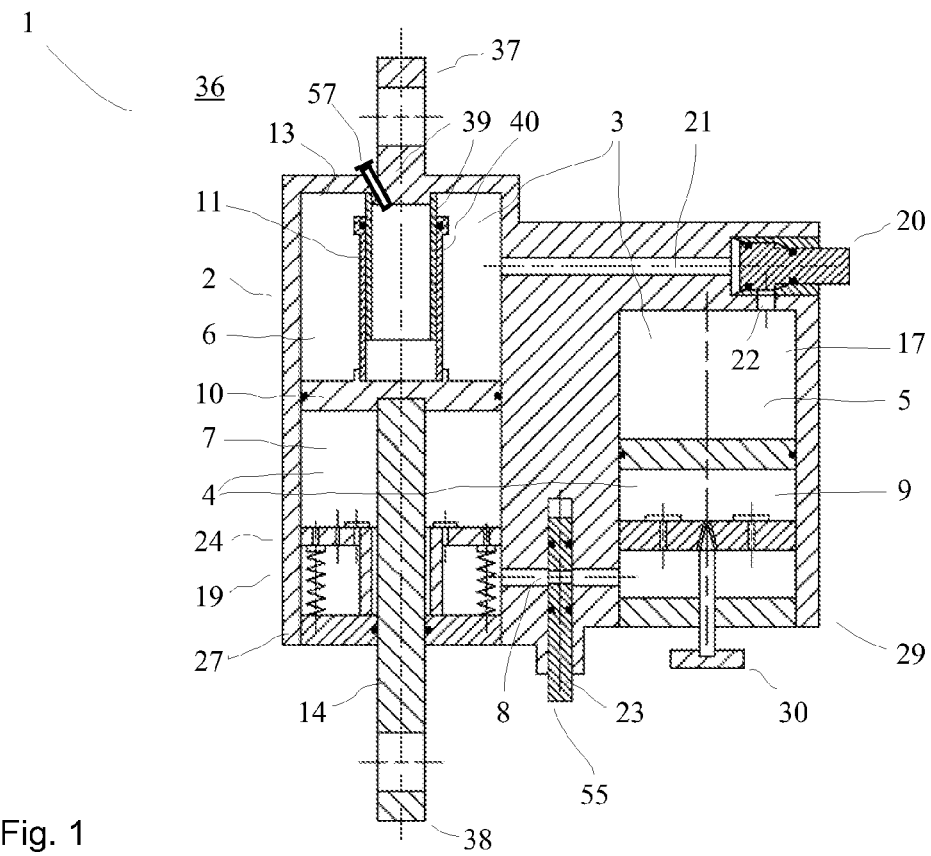
FIG. 1 a schematic, cross-sectional illustration of an inventive damper.
Figure 2:
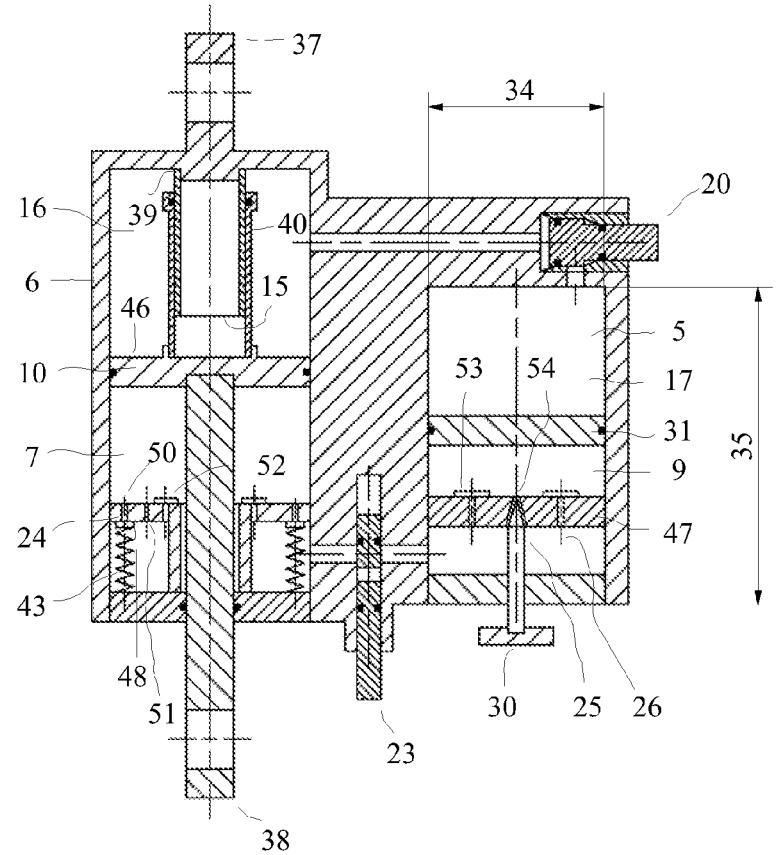
FIG. 2 a schematic cross-section of the damper according to FIG. 1 with the lock-out valve closed.

With reference to the FIGS. 1 to 3 a first embodiment of an inventive damper 1 is described first.

The damper 1 illustrated in FIG. 1 in a schematic section is configured as a pull shock damper 2, presently comprising two housing parts 27 and 28 provided at a housing 19. The first connecting end 37 and the second connecting end 38 are arranged at the housing part 27 for connection with a bicycle frame.

Typically such a pull shock damper 2 is connected with the rear wheel of a bicycle via a rocker-type structure such that for example the housing part 37 is arranged at one end of the rocker while the rear wheel is connected at the other end of the rocker. A rocker-like configuration achieves that as the rear wheel deflects the piston rod 14 is pulled out of the housing part 27. In this way the damping medium located in the oil chamber 7 is conveyed through the throttle device 24 and the flow duct 8 to the second oil chamber 9. The floating piston 31 in the housing part 28 is displaced correspondingly and the volume of the positive chamber 17 of the positive spring 5 compresses.

Presently the spring device 3 of the pull shock damper 2 comprises a negative chamber 6 in the housing part 27 and a positive chamber 17 in the housing part 28 which are spatially separated from one another.

Filling both the positive chamber 17 and the negative chamber 6 occurs via the air valve 20 which is connected through a duct 21 with the negative chamber 6 and through a duct 22, with the positive chamber 17. This configuration results in that filling with air through the air valve 20 always has both the negative chamber 6 and the positive chamber 17 filled at the same air pressure. When the air valve is closed, the ducts 21 and 22 and thus the negative chambers 6 and the positive chambers 17 are separated from one another so as to then prohibit pressure equalization via the ducts 21 and 22.

Despite the predetermined cross-sections of the negative chamber 6 and the positive chamber 17 the force acting on the floating piston 10 in the negative chamber 6 is limited by way of blocking out a subarea 15. The subarea 15 is masked by the first tube 39 of the tubular structure 11 such that in this place the internal pressure in the negative chamber 6 cannot act on the floating piston 10. To this end the tubular structure 11 is sealed gas-tight relative to the interior 12 of the negative chamber 6. The annular surface 46 of the floating piston 10 on which the pressure in the interior 12 of the negative chamber 6 acts, is considerably reduced.

For deaerating the raw [sic] structure a valve 57 may be provided which will be explained in more detail with reference to FIG. 11.

At the end 13 of the negative chamber 6 the raw [sic] structure 11 in the exemplary embodiments according to FIGS. 1 to 3 and 5 to 10 is connected with the housing 19 and also with the housing part 27 where it is connected tight therewith. In this way it is ensured that the subarea 15 is blocked out and does not exert any significant force in the direction of the first oil chamber 7. In the embodiment according to FIG. 4 the tubular structure 11 is sealingly guided to the exterior through the end 13. There the subarea formed by the tubular structure 11 also does not exert any considerable and presently not even significant force on the floating piston 10 in the direction of the first oil chamber 7.

The subarea 15 is larger than a cross-sectional area of the in particular round piston rod 15 and it is in particular at least twice the size. Three, four or five times the cross-section has shown good results.

Thus, equal filled pressures in the negative chamber 6 and the positive chamber 17 in the normal state notwithstanding, a suitable, optimal pressure and force ratio can be set between the negative chamber 6 and the positive chamber 17. The user is reliably prevented from making undesirable settings which adversely affect the spring characteristics of the damper 1.

Between the first oil chamber 7 and the second oil chamber 9 a throttle device 24 for the compression stage is provided comprising a series of throttle valves. The high-speed throttle valves 49 for the compression stage comprise ducts 50, biasing springs 43, and shims 48. A high-speed throttle valve 49 for the compression stage opens as the differential pressure between negative chamber and positive chamber exceeds a specific level. The throttle valve 51 for the low-speed compression stage may, other than a duct, likewise comprise springs and shims. Oil flows through the throttle valve 51 for the low-speed compression stage even in the case of low differential pressures. The high-speed throttle valve 49 for the compression stage, however, opens only at higher loads. Check valves 52 with shims 42 open for returning oil.

Between the first oil chamber 7 and the second oil chamber 9 a throttle device 47 for the rebound stage is furthermore provided, also comprising a series of throttle valves. The rebound stage throttle valve 54 comprises at least one flow duct 25 and an adjusting knob 30 or an adjusting lever or another adjusting device or the like for changing the flow cross-section of the flow duct. Further valves may be provided with biasing springs and shims 42. The valves 53 serve as check valves and are equipped with flow ducts 26 and shims 42.

Between the first oil chamber 7 and the second oil chamber 9 an adjusting valve 23 may be provided for example in the flow duct 8, and may serve as a lock-out valve as well. The adjusting valve 23 is opened in the position shown in FIG. 1, thus allowing a flow connection between the first oil chamber 7 and the second oil chamber 9, while it is closed in the illustration according to FIG. 2, blocking the flow duct 8. A partial closure of the flow duct 8 is conceivable as well.

The tubular structure 11 in the exemplary embodiment according to FIGS. 1 to 3 consists of a telescopic structure having an inner tube 39 and an outer tube 40 sliding thereon, which are sealed off from one another by corresponding seals to permanently separate the interior of the tubular structure 11 from the pressure prevailing in the negative chamber 6. The inner tube 29 diameter presently determines the effective area 15.

To intentionally influence the spring characteristics of the positive spring 5 on the whole and/or the progression of the positive chamber 17, the effective length 35 of the positive chamber 17 may be configured variable. It is likewise possible to vary the inner diameter 34 of the positive chamber 17. In configurations such as e.g. in the embodiment according to FIG. 5 the lengths 35 of some or all of the positive chambers 17 and 18 may be individually adjustable. A larger length 35 causes lower progression while in the case of shorter lengths 35 and otherwise constant conditions the spring has a steeper load-deflection curve. Directed combinations of individual positive chambers 17 and 18 thus allow flexible adjustments.

The top view schematically shown in FIG. 3 shows the housing 19 with the two housing parts 27 and 28 of the damper 1.

FIG. 4 illustrates a variation of the embodiment according to the FIGS. 1 to 3 with the present tubular structure configured as a single tube extending out of the negative chamber 6 to the exterior up to the ambience 36. The housing part 27 is sealed relative to the tubular structure 11 by way of corresponding sealing. The tubular structure 11 is in particular configured hollow inside to reduce the weight.

In this configuration a telescopic tubular structure 11 is not required since as the floating piston 10 enters into the housing part 27 the tubular structure 11 emerges a corresponding distance out of the housing part 27 at the other end 13. Presently the outer diameter of the raw [sic] structure 11 determines the effective area 15.

The outer diameter of the tubular structure 11 is presently larger than the outer diameter of the piston rod 14. The ratio of the outer diameters is in particular larger than 12:10 and preferably larger than 15:10. The ratio of the cross-sectional area 15 of the tubular structure 11 to the cross-sectional area of the piston rod 14 is larger than 1 and in particular larger than 1.5 preferably larger than 2 or else 3.

The remaining arrangement of each of the components and their functions correspond to the embodiment according to the FIGS. 1 to 3.

With reference to the FIGS. 5 to 10 another exemplary embodiment of a damper 1 according to the invention and configured as a pull shock damper 2 will be described below. FIG. 5 shows a simplistic top view of the pull shock damper 2, which in the present embodiment comprises three housing parts 27, 28, and 29 at the housing 19. Presently the first connecting end 37 and the second connecting end 38 are provided to be provided at the housing part 27.

While the housing part 27 is presently provided with the negative spring 6 and the first oil chamber 7, the housing parts 28 and 29 are each provided with a positive chamber 17 and a positive chamber 18 and a second oil chamber 9 and a third oil chamber 32. The first positive chamber 17 may be separated from the second oil chamber 9 by means of a separating device configured as a floating piston 31. Likewise the second positive chamber 18 may be separated from the third oil chamber 32 by means of a separating device presently configured as a second floating piston 33.

The separating device may be configured flexible as a membrane or rubber bulb or the like.

Depending on the configuration it is conceivable for the second oil chamber 9 and the positive chamber 17 to form one common chamber and for the third oil chamber 32 to form one common chamber with the second positive chamber 18. Separation of air from oil then occurs by way of gravity.

Figure 6:
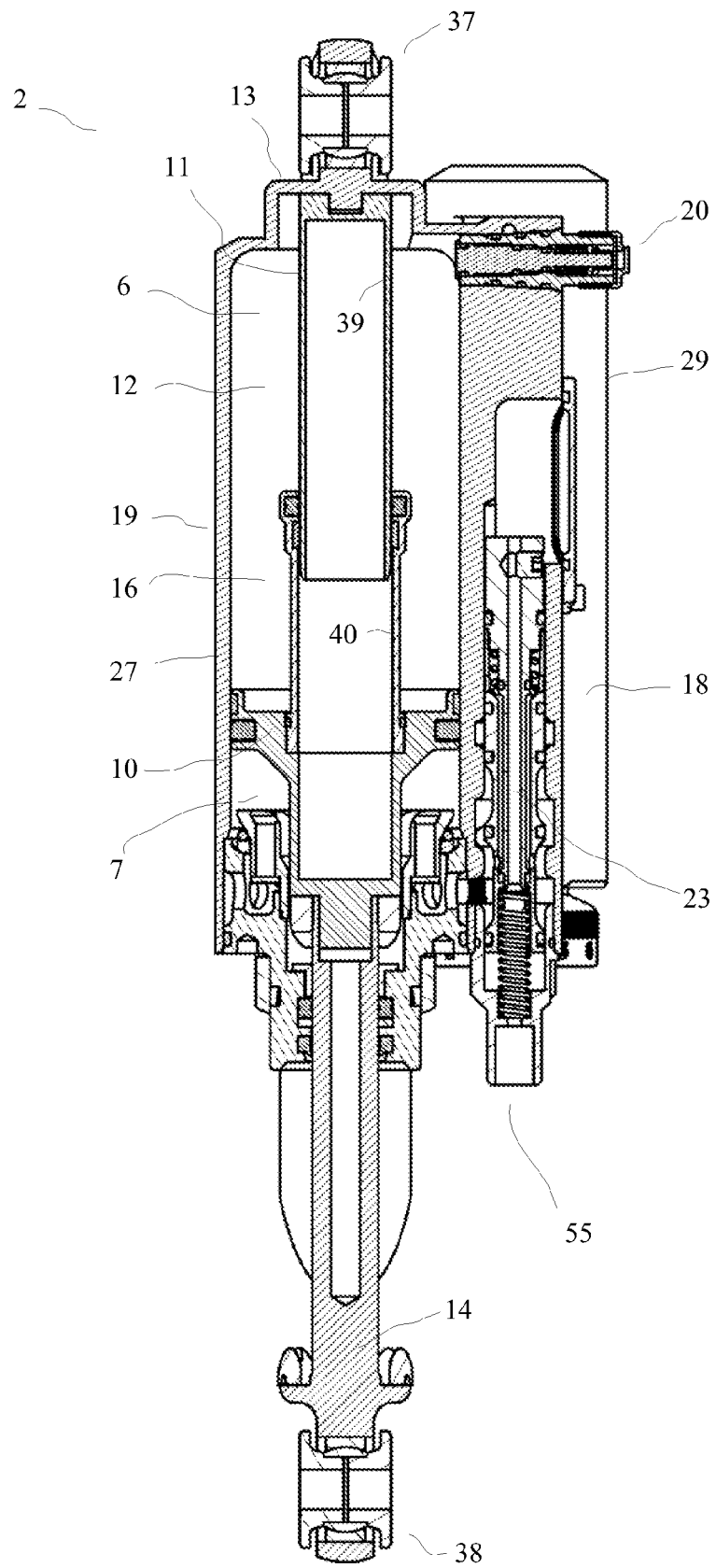
FIG. 6 the damper of FIG. 5 in a first spring position.

The pull shock damper 2 illustrated in FIG. 6 in a first spring position in section A-A according to FIG. 5 in turn comprises a tubular structure 11, comprising two telescopic tubes 39 and 40 sealed by means of a seal from one another and from the interior 12 of the negative chamber 6.

Although in this configuration the pull shock damper 2 comprises two housing parts 28 and 29 with positive chambers 17 and 18 positioned therein, only the housing part 27 with the negative spring 6 and the housing part 29 with the positive chamber 18 are visible due to the position of the section according to FIG. 6.

Figures 7, 8, 9:
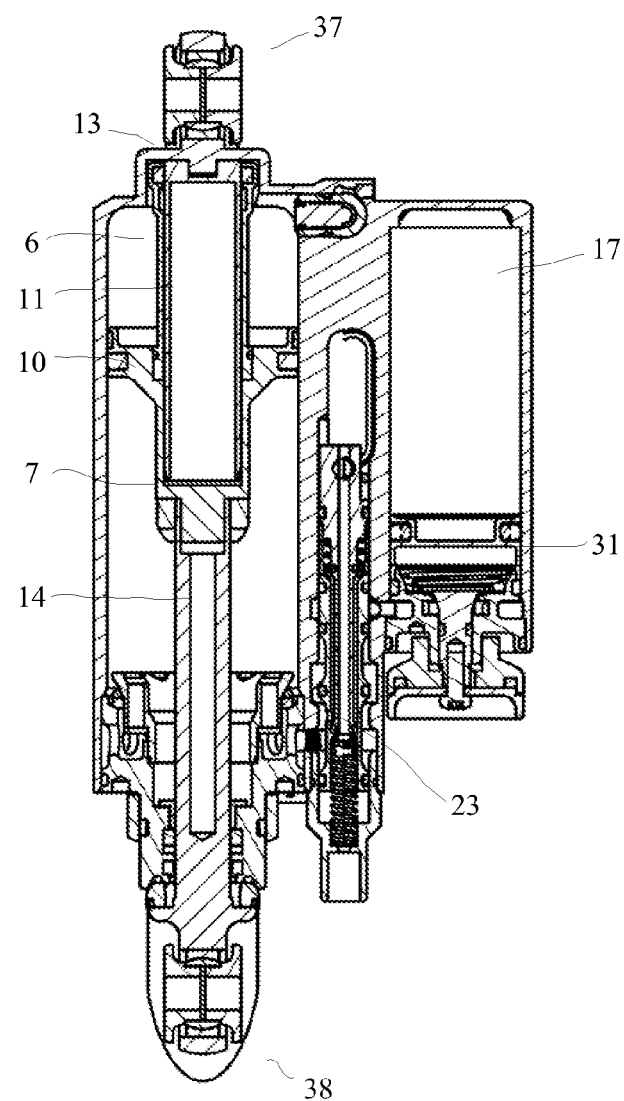
FIG. 7 the damper of FIG. 5 in a second spring position.
FIG. 8 the filling valve in closed position.
FIG. 9 the filling valve in opened position.

FIG. 7 shows the damper according to FIGS. 5 and 6 with a piston rod 14 retracted further. It can clearly be seen that the telescopic tubes 39 and 40 of the tubular structure are retracted far into one another, reliably sealing the interior in the tubular structure 11 from the negative chamber 6.

FIG. 8 shows the air valve 20 of the pull shock damper 2 from FIGS. 5 to 7 in closed position with an end cap 45 screwed on as a protection for the air valve 20.

FIG. 9 shows the air valve 20 in opened position in which an opening 44 towards the interior is present. Again, ducts 21 and 22 are provided connecting the air valve 20 with the negative chamber 6 or the positive chambers 17 and 18 respectively. In this state all of the positive and negative chambers are connected with one another and with the air valve so as to allow joint filling and/or defined pressure relief. This causes to always generate the same pressure in the negative chamber 6 and the positive chambers 17 and 18 in filling.

On the whole the invention provides a damper 1 simple in structure which, having one shared air valve only, allows to fill both the negative chamber 6 and the positive chambers 17 and 18. Improper settings due to too high or too low pressures in the positive or negative chambers are thus reliably avoided.

Figure 10:
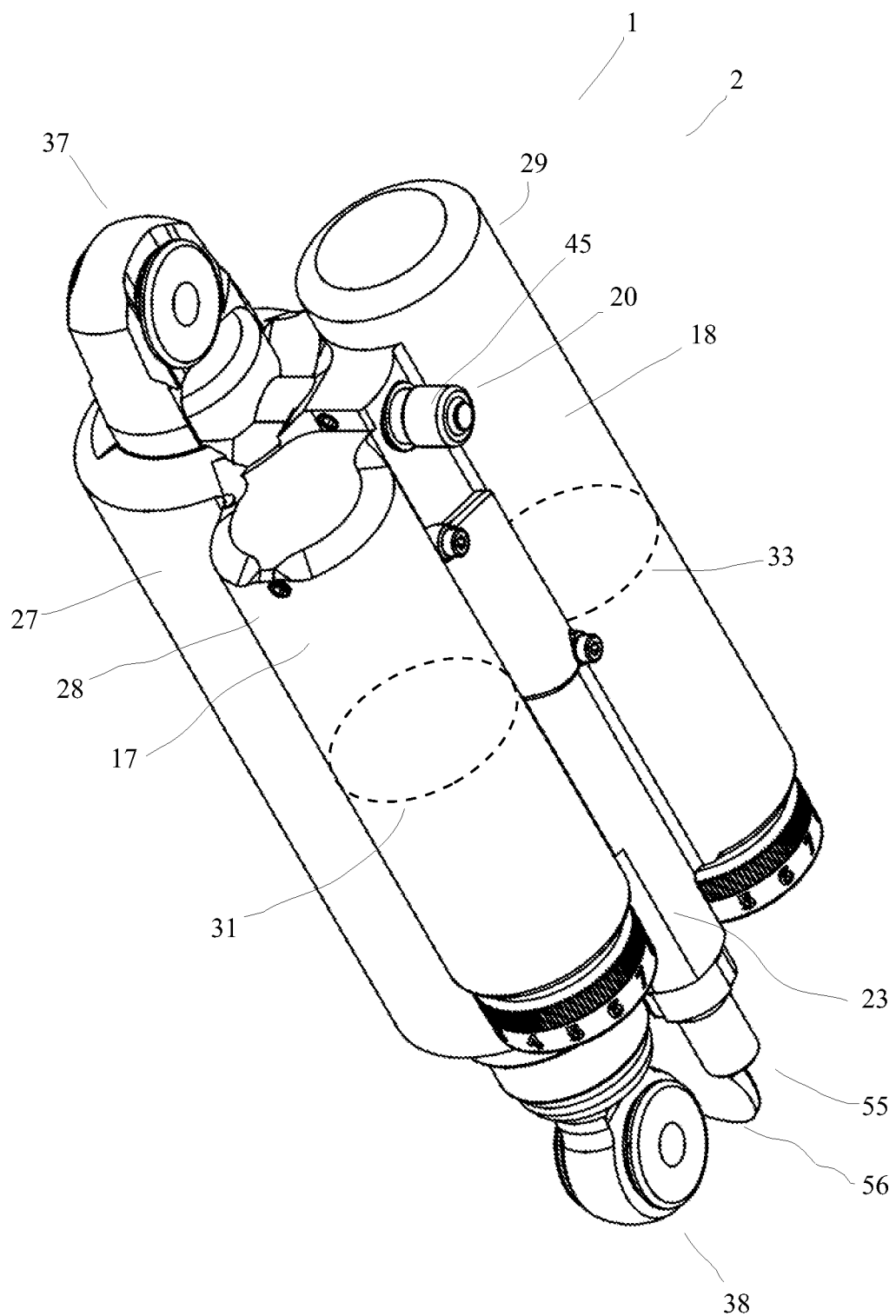
FIG. 10 a perspective view of the damper of FIG. 5.

FIG. 10 shows in a perspective section view the damper 1 with the housing parts 27, 28, and 29, and the housing part with the adjusting valve 23. The adjusting valve 23 allows to engage or disengage one or both of the positive chambers 17 and 18 of the positive spring 5 to influence the spring and damping characteristics. Locking of both the positive chambers 17 and 18 causes a lockout. In the present embodiment the adjusting valve 23 is configured linearly movable in the longitudinal direction to engage or disengage the positive chambers 17 and 18 by way of linear displacement. It is also conceivable to employ a rotary operating member 55 or a rotary adjusting valve 23 or a remote control via a cable 56 from the handlebar.

Optionally it is not only possible to engage and disengage the positive chambers 17 and 18 one by one, but it may be conceivable to intentionally vary the cross-sections of the connection ducts to the positive chambers 17 and 18.

The housing part 28 is provided with a separating device as a first floating piston 31 to separate the first positive chamber 17 from the second oil chamber 9. The housing part 29 is provided with a second separating device which is presently configured as a second floating piston 33. The second floating piston 33 separates the second positive chamber 18 from the third oil chamber 32.

Figure 11:
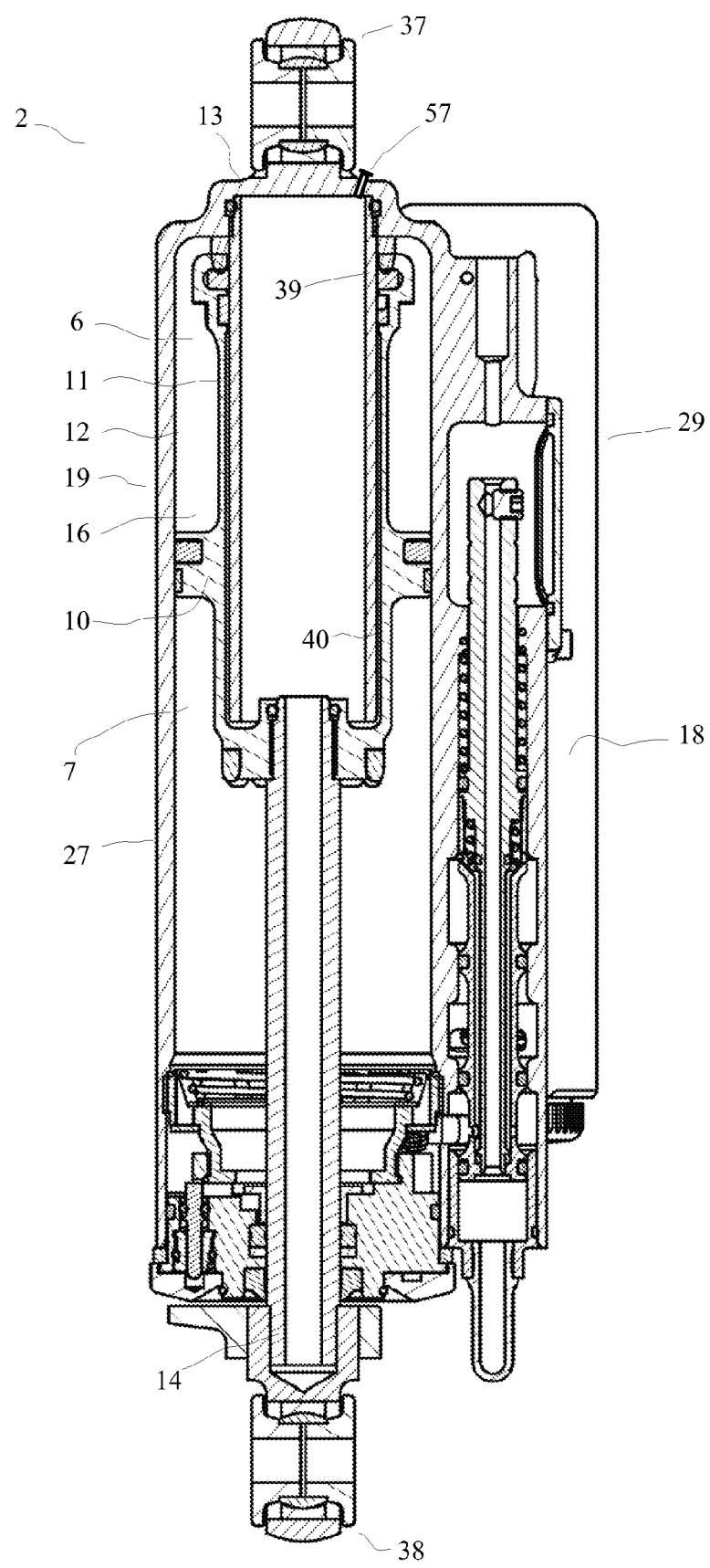
FIG. 11 a cross-section of another embodiment of an inventive damper.

FIG. 11 shows a cross-section of another damper 2 according to the invention.

The pull shock damper 2 illustrated in FIG. 11 externally substantially corresponds to the damper 2 according to FIG. 6 or FIG. 10, in particular also comprising two positive chambers 17 and 18. The positive chamber 18 is disposed in the housing part 29. A tubular structure 11 is disposed in the negative chamber 6. The tubular structure comprises a pair of telescopic tubes 39 and 40 sealed off from one another and relative to the interior 12 of the negative chamber 6 by means of a seal.

The outer tube 40 of the tubular structure 11 is presently formed integrally with the piston configured as a floating piston 10. In this way the quantity of parts is reduced. The quantity of seals can be reduced as well.

In all of the configuration variants a valve 57 may be provided as an overflow valve or a pressure-relief-valve to directly or indirectly connect the tubular structure 11 interior with the ambience. The valve channel of the valve 57 may be provided directly through the housing wall to the exterior or else extend through the end 13. The valve 57 preferably opens automatically in case that considerable excess pressure should build up in the interior of the tubular structure 11. Due to minor leakages, some gas from the negative chamber may ooze into the interior of the tubular structure during operation which might somewhat reduce or impair function in the long run.

A valve 57 configured as a manual valve allows manual venting as required or for example in routine maintenance or inspection. If the valve 57 is configured as an automatic pressure-relief-valve it opens, permitting gas to escape to the exterior for example if the pressure in the interior of the tubular structure 11 has reached or exceeded two, three or four bar. This allows to ensure still reliable operation.

The dampers according to the other exemplary embodiments may likewise be equipped with a corresponding valve 57.

As to the rest, the structure of the damper 2 according to FIG. 11 corresponds to the structure of the dampers of the other exemplary embodiments.

Figure 12:
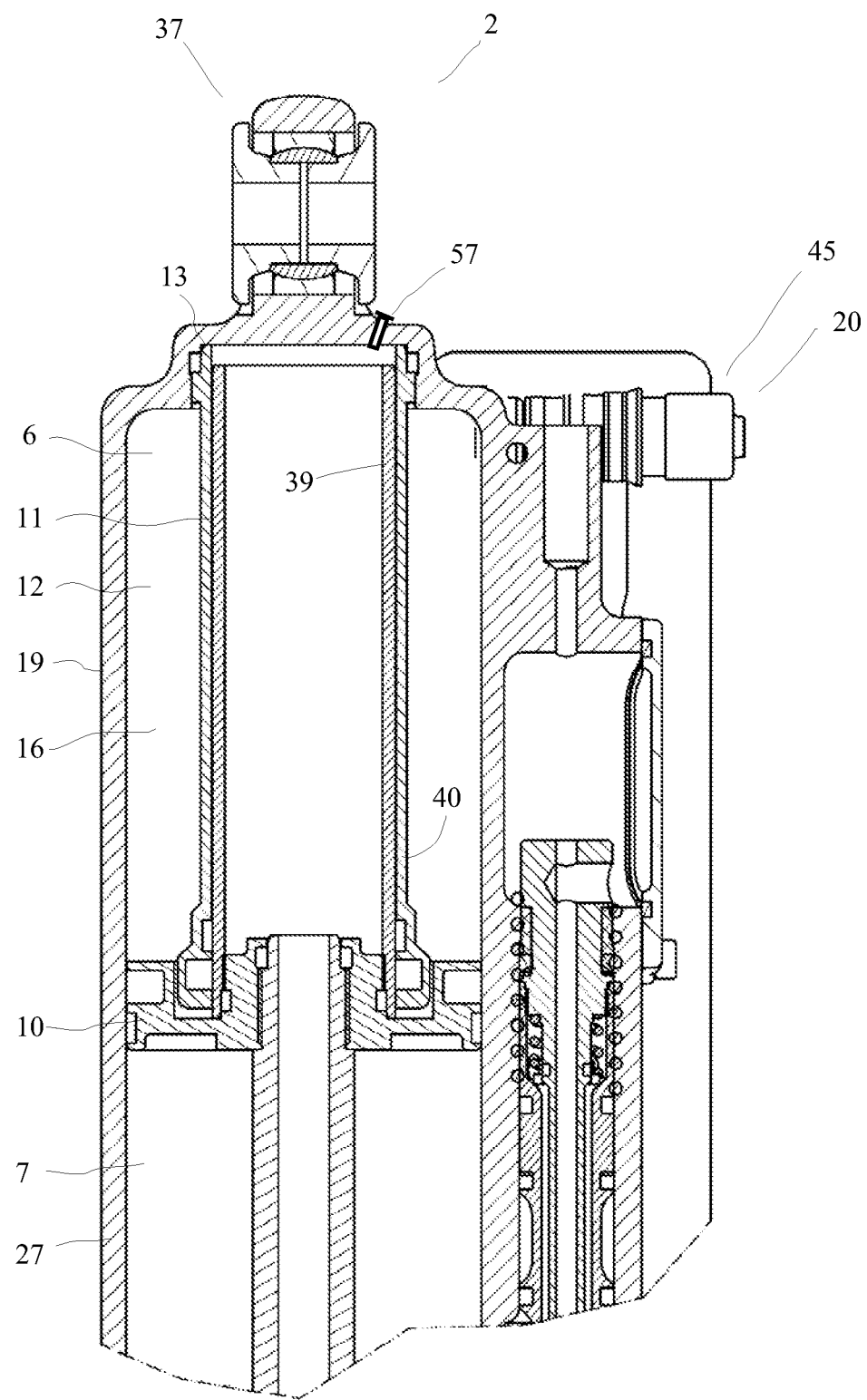
FIG. 12 a cross-section of another embodiment of an inventive damper.

FIG. 12 shows a sectional view of another exemplary embodiment of a damper 2. The tubular structure 11 of the damper is telescopic, also comprising an inner tube 39 and an outer tube 40.

The damper 2 according to FIG. 12 is functional in structure as is the damper according to the exemplary embodiment according to FIG. 3. In contrast to this, however, the inner tube 39 is fixedly connected with the floating piston 10. The outer tube 40 is fixedly connected with the end 13. In the exemplary embodiment according to FIG. 3 the inner tube 39 is connected with the end 13 and the outer tube 40, with the floating piston 10.

Other than employing the damper according to the invention in bicycles, use in other two-wheeled vehicles is conceivable as well. In particular can the inventive damper be [provided] in electric bikes and in bicycles with electric auxiliary motor and also in other motor-operated two-wheeled vehicles.

| List of reference numerals: | |
| --- | --- |
| 1 | damper |
| 2 | pull shock damper |
| 3 | spring device |
| 4 | damper device |
| 5 | positive spring |
| 6 | negative chamber |
| 7 | oil chamber, first oil chamber |
| 8 | flow duct |
| 9 | second oil chamber |
| 10 | floating piston |
| 11 | tubular structure |
| 12 | interior (space) |
| 13 | end |
| 14 | piston rod |
| 15 | subarea |
| 16 | negative spring |
| 17 | positive chamber |
| 18 | positive chamber |
| 19 | housing |
| 20 | air valve |
| 21 | duct |
| 22 | duct |
| 23 | adjusting valve |
| 24 | throttle device |
| 25 | throttle valve |
| 26 | throttle valve |
| 27 | housing part |
| 28 | housing part |
| 29 | housing part |
| 30 | adjusting knob |
| 31 | first floating piston |
| 32 | third oil chamber |
| 33 | second floating piston |
| 34 | diameter |
| 35 | length |
| 36 | ambience |
| 37 | first connecting end |
| 38 | second connecting end |
| 39 | first tube |
| 40 | second tube |
| 41 | shim |
| 42 | shim |
| 43 | spring |
| 44 | opening |
| 45 | cover cap |
| 46 | annular surface |
| 47 | throttle device |
| 48 | shim |
| 49 | valve high-speed |
| 50 | duct |
| 51 | valve low-speed |
| 52 | check valve |
| 53 | check valve |
| 54 | throttle valve rebound stage |
| 55 | operating member |
| 56 | cable |
| 57 | valve |

The invention claimed is:

1. A damper for a bicycle, comprising: at least one spring device and at least one damper device, the spring device having at least one positive spring including a positive chamber and at least one negative spring with at least one gas operated negative chamber, the damper device including at least one first oil chamber and at least one second oil chamber, the negative chamber abutting the first oil chamber via a floating piston, wherein the floating piston is firmly connected with a piston rod, at least one tubular structure extending from the floating piston through an interior of the negative chamber at least until an end of the negative chamber, and the piston rod of the floating piston extends through the first oil chamber and beyond an end of the first oil chamber, and a first duct positioned on a first side of the floating piston that connects the positive chamber to the at least one negative chamber, and a second duct positioned on an opposing, second side of the floating piston connecting the at least one first oil chamber and the at least one second oil chamber.

2. The damper according to claim 1, wherein the tubular structure comprises at least two telescopic tubes connected gas-tight with one another and extending at least from the piston up to the end of the negative chamber.

3. The damper according to claim 1 wherein an outer diameter of the tubular structure is larger than an outer diameter of the piston rod.

4. The damper according to claim 1 wherein an effective area of the tubular structure is larger than a cross-sectional area of the piston rod.

5. The damper according to claim 1 wherein the positive spring comprises at least one gas-operated positive chamber.

6. The damper according to claim 5 wherein an air valve is provided at the housing serving for filling the negative chamber and at least one positive chamber.

7. The damper according to claim 6 wherein the air valve is connected with the negative chamber and the positive chamber through at least one duct so that the pressure in the negative chamber and in the positive chamber is substantially the same pressure during filling with air.

8. The damper according to claim 1 wherein between the first oil chamber and a second oil chamber at least one adjustable throttle device with at least one throttle valve is provided.

9. The damper according to claim 1 wherein the second oil chamber is positioned in one housing part with the positive chamber wherein the second oil chamber is separated from the positive chamber by a first separating device.

10. The damper according to claim 1 wherein a progression of the positive chamber is variable.

11. The damper according to claim 1 wherein a valve is provided for deaerating the tubular structure.

* * * * *